(12) United States Patent
Fidoe et al.

(10) Patent No.: US 6,926,836 B2
(45) Date of Patent: Aug. 9, 2005

(54) TREATMENT OF IRON SULPHIDE DEPOSITS

(75) Inventors: Stephen David Fidoe, Aberdeen (GB); Robert Eric Talbot, Staffordshire (GB); Christopher Raymond Jones, West Midlands (GB); Robert Gabriel, Mechanicsville, VA (US)

(73) Assignee: Rhodia Consumer Specialties Limited, Watford (GB)

( * ) Notice: Subject to any disclaimer, the term of this patent is extended or adjusted under 35 U.S.C. 154(b) by 0 days.

(21) Appl. No.: 10/345,720

(22) Filed: Jan. 16, 2003

(65) Prior Publication Data

US 2003/0226808 A1 Dec. 11, 2003

Related U.S. Application Data

(63) Continuation of application No. PCT/GB01/03139, filed on Jul. 10, 2001.

(30) Foreign Application Priority Data

Jul. 20, 2000 (GB) .............................................. 0017675

(51) Int. Cl.$^7$ ................................................. C02F 5/14
(52) U.S. Cl. ............................. 210/700; 134/3; 134/41; 166/244.1; 252/180; 252/181; 422/15
(58) Field of Search ............... 134/3, 41; 210/696–701, 210/702, 728, 729, 732, 733, 764; 252/180, 181; 166/244.1; 422/15

(56) References Cited

U.S. PATENT DOCUMENTS

| | | | |
|---|---|---|---|
| 3,578,708 A | | 5/1971 | Carlson |
| 4,017,610 A | * | 4/1977 | Baker .......................... 514/107 |
| 4,276,185 A | * | 6/1981 | Martin ........................ 510/188 |
| 4,381,950 A | * | 5/1983 | Lawson .......................... 134/3 |
| 4,673,509 A | * | 6/1987 | Davis et al. ................. 210/699 |
| 5,741,757 A | * | 4/1998 | Cooper et al. .............. 504/153 |
| 6,001,158 A | * | 12/1999 | Elphingstone et al. ... 106/18.31 |
| 6,482,483 B1 | * | 11/2002 | Fidoe et al. ............... 428/35.7 |
| 6,784,168 B1 | * | 8/2004 | Jones et al. .................. 514/76 |

FOREIGN PATENT DOCUMENTS

| | | |
|---|---|---|
| GB | 1 203 268 A A | 8/1970 |
| WO | WO 00/21892 A A | 4/2000 |

* cited by examiner

Primary Examiner—Peter A. Hruskoci
(74) Attorney, Agent, or Firm—Frishauf, Holtz, Goodman & Chick, P.C.

(57) ABSTRACT

Treating a water system containing or in contact with a metal sulphide scale to inhibit, prevent, reduce, dissolve or disperse iron sulphide deposits. A solution of tris(hydroxyorgano)phosphines (THP) and tetrakis(hydroxyorgano)phosphonium salts (THP$^+$ salts) and sufficient of a chelant (amino-carboxylates or amino-phosphonates) to provide a solution containing from 0.1 to 50% by weight of said THP or THP$^+$ salt and from 0.1 to 50% by weight of said chelant, is contacted with the metal sulphide scale thereby to dissolve at least part of said scale in said solution.

29 Claims, No Drawings

TREATMENT OF IRON SULPHIDE DEPOSITS

This is a Continuation Application of International Application No. PCT/GB01/03139 filed Jul. 10, 2001, which is incorporated herein by reference in its entirety.

The present invention relates to a method of preventing or alleviating the problems which are commonly associated with deposits of iron sulphide, and to novel formulations for use therein.

Ferrous sulphide deposits are a major source of economic loss in the oil industry. The deposits are mainly the result of a reaction between hydrogen sulphide, formed by sulphate-reducing bacteria, and ferrous metal oil field equipment and/or iron compound in the formation. They obstruct the flow of oil through wells and in the adjacent strata and also in pipelines and in processing and refinery plant. Ferrous sulphide particles also tend to stabilise oil water emulsions which often form, especially during secondary oil recovery, and present major problems to oil producers. Problems due to iron sulphide deposits are by no means confined to the oil industry but are encountered in a wide range of industrial water systems. For instance ferrous sulphide deposits are a serious problem in the paper industry, causing scaling of Fourdriniers and other paper making equipment.

The simplest way to dissolve a deposit of ferrous sulphide is by contact with strong acid. Unfortunately this method generates large volumes of highly toxic hydrogen sulphide gas, which in the past has been responsible for fatalities. This method is therefore no longer an acceptable approach to the problem, in most areas.

An alternative method of treating the deposits with powerful oxidising agents avoids the toxicity hazards but produces oxidation products, including elemental sulphur, which are so corrosive to pipework that it has not generally been practised.

A commonly used agent for treating iron sulphide is acrolein despite the very severe health, safety and environmental problems to which it gives rise. There is an urgent need for a less toxic and more environmentally acceptable alternative to acrolein.

Recently it has been found that tris (hydroxymethyl) phosphine (referred to herein as THP) is capable of solubilising iron sulphide by forming a bright red water soluble complex. THP is believed to be formed in oil wells treated with tetrakis (hydroxmethyl) phosphonium salts (THP salts). THP salts, especially the sulphate, THPS, are commonly added to oil wells as biocides. Such salts are highly effective at killing the sulphate reducing bacteria, whose activity was largely responsible for the original formation of the iron sulphide deposits. Unfortunately the effectiveness of THP as a solubilising agent for iron sulphides varies considerably from well to well. It has been shown that this is because the complex with iron sulphide requires the presence of ammonium ions. Although ammonium ions are normally present in oil field water, the concentration is frequently less than the optimum for iron sulphide removal. We have also found that pH is critical to the formation of the complex. The pH of water systems in oil fields can vary substantially.

THP salts are stable under acidic conditions in the absence of air or oxidising agents. At pH above 3 and in the absence of oxidising agents they are gradually converted to THP. Conversion is rapid and substantially complete between pH of about 4 and 6. Above pH 7, or in the presence of oxidising agents THP salts or THP are converted to tris(hydroxymethyl)phosphine oxide (THPO), conversion being rapid and substantially complete at pH above about 10, e.g. 12. THPO is not effective as a complexant for ferrous sulphide.

Attempts to formulate THP with ammonia have been hindered by the tendency of THP and ammonia to react together forming an insoluble polymer. PCT/GB99/03352 describes a formulation of THP salt with an ammonium salt which releases THP and ammonia when the pH is raised. This, however, only partially solves the problems of THP ammonia compatibility. The formulation is only fully stable at pH below 4, and polymerisation is rapid at any pH greater than 6, but the complex only forms readily at a pH above 5. If the ammonia concentration is high there is a risk of polymer depositing in the formation and obstructing the flow of oil or water.

For all the foregoing reasons it is difficult to obtain consistent performance in preventing or removing iron sulphide scale using THP.

We recently discovered (unpublished GB patent application 005444.5 filed 8 Mar. 2000) that water soluble condensates of THP with co-condensable organic nitrogen compounds such as urea and thiourea are also capable of solubilising iron sulphide and provide more consistent performance than THP/ammonia mixtures. However such condensates may also cause deposition of polymers if used in high concentration.

As used herein the expression "THP" is used, whenever the context permits, to refer generally to THP itself and also to THP salts.

We have now discovered that THP and amino carboxylic acids or amino phosphonic acids act synergistically to dissolve iron sulphide deposits, even in the absence of ammonia. Moreover THP is stable in the presence of amino phophonates even when the two are formulated together, and stored for extended periods prior to use.

The invention provides the use of a synergistic mixture of THP or a THP salt and an amino carboxylate or amino phosphonate chelant to inhibit, prevent, reduce, dissolve or disperse deposits of a metal sulphide in aqueous systems.

According to one embodiment the invention provides a method of treating a water system containing or in contact with a metal sulphide scale, which method comprises adding to said system, separately or together, sufficient THP and sufficient of an amino carboxylate or amino phosphonate chelant to provide a solution containing from 0.1 to 50% by weight of THP and 0.1 to 50% chelant, contacting said solution with said scale, thereby dissolving at least part of said scale in said solution and withdrawing said dissolved metal sulphide from the system.

The metal sulphide scale may be, for example, iron sulphide. Alternatively, the metal sulphide may be lead sulphide or zinc sulphide or a combination of iron or lead zinc sulphides. The iron sulphide may be Troilite (FeS) or pyrite ($FeS_2$). Alternatively, the iron sulphide may be mackinawite ($Fe_9S_8$) or phyrrhotite ($Fe_7S_8$).

The chelant preferably has at least 1 and more preferably two or more amine nitrogen atoms and at least 1 and preferably more than 1 carboxy or phosphono group.

The chelant is preferably an amino phosphonate. The latter may conveniently be a compound of the formula $R^1R^2NCH_2PO_3X_2$ where each of $R^1,R^2$, which may be the same or different, is an organic group and X is hydrogen or a cation such that the amino phosphonate is water soluble. In particular we prefer that at least one of $R^1,R^2$ is a—$CH_2PO_3X_2$ group and the other is selected from $CH_2PO_3X_2$, $(CH_2)_nOH$ and $[(CH_2)_nNCH_2PO_3X_2]_m CH_2PO_3X_2$ where each n is independently 2 or 3 and m is from 1 to 5.

Particularly preferred are ethylenediamine tetrakis (methylene phosphonates) and diethylene triamine pentakis (methylene phosphonates). Also of use are, for example, amino tris (methylene phosphonate), ethanolamine bis (methylene phosphonates) and triethylene tetramine hexakis (methylene phosphonates) as well as mixtures of two or more of the above amino phosphonates.

Alternatively the chelant may be an amino carboxylic acid such as nitrilo triacetic acid or, preferably, ethylene diamine tetraaetic acid.

We prefer that X is an alkali metal, especially potassium or, most preferably, sodium, or ammonium. X may also be, for example an organic base such as an alkylamine or alkanolamine having a total of up to six carbon atoms.

The proportion of THP to chelant may generally be from 1:40 to 40:1 by weight, most usually 1:30 to 30:1 especially 1:20 to 20:1, more especially 1:10 to 10:1, preferably 1:5 to 5:1, more preferably 1:4 to 4:1, most preferably 1:2 to 2:1, typically 1.5:1 to 1:1.5, e.g. 1:1.

The synergistic mixture is preferably present in conjunction with a buffer, which is preferably a water soluble carboxylate salt of a strong base. Such compositions are novel and constitute a preferred aspect of the invention. The carboxylate may for example be a formate, acetate, propionate, lactate, tartrate, maleate, fumarate, acrylate, citrate, oxalate, malate, succinate, adipate, malonate, caprate, suberate, azelaate, pimelate, aconitate, citraconate, itaconate, angelate, tiglate, crotonate, isocrotonate, salicylate, phthalate, phenylacetate or benzoate. The strong base may be an alkali metal or ammonium ion. Particularly preferred are sodium, potassium, rubidium and caesium salts. The first of these is generally preferred on economic grounds, but the last is sometimes chosen on account of its high density, which is useful in penetrating deep formations. The buffer usually additionally comprises free carboxylic acid to maintain the formulation in the preferred pH range. Alternatively the buffer may be formed by using a THP salt with the carboxylate salt, relying on the acidity of the former to establish the buffer pH.

THP alone with a water soluble carboxylate salt of a strong base is also effective at dissolving iron sulphides.

Particularly preferred are THP, amino phosphonate mixtures buffered with citrates such as a mixture of citric acid with trisodium citrate. We prefer that the composition, or the water system to be treated, should be buffered to a pH between 4.5 and 7, most preferably 5 to 6 e.g. 5.2 to 5.8.

The carboxylate and the THP chelant mixture exhibit a strong synergism. Carboxylate buffers alone generally only solubilise iron sulphide by reducing the pH. The capability of such buffers alone to remove iron sulphide deposits is small compared with stronger acids, but is nevertheless accompanied by substantial evolution of toxic hydrogen sulphide. Carboxylate buffered THP amino phosphonate mixtures on the other hand dissolve the sulphide deposit substantially faster than the unbuffered mixture and with negligible evolution of hydrogen sulphide. The preferred ratio of carboxylate to THP is from 1:30 to 1:1 by weight e.g. 1:15 to 1:2 especially 1:10 to 1:4 e.g. 1:7 to 1:5.

The THP chelant mixtures are particularly effective at temperatures above 40° C., especially above 50° C., particularly 60 to 150° C., preferably 65 to 100° C. e.g. 70 to 90° C., which are ambient temperatures at the down-hole loci where solubilisation of iron sulphide is more of a problem. The preferred dose rate depends on the nature and severity of the problem. THP and chelant may be continuously or intermittently dosed, together or separately, to a potentially deposit forming system in order to inhibit or prevent deposition. It may be shock dosed to an already fouled system or it may be pumped at relatively high concentration into a badly fouled system and left to soak until the deposit has been substantially reduced or removed.

Generally the complete solubilisation of an established deposit requires a stoichiometric proportion of THP mixtures. However lesser amounts may suffice to loosen the deposit and allow it to be flushed out of the system. Low concentrations down to threshold levels will often be enough to inhibit or prevent deposition.

Concentrations of THP and chelant may each, independently range from 1 ppm up to saturation depending on the requirements of the system. More usually the concentration of each in the aqueous system will be from 0.1 to 50% by weight, preferably 0.2% to 30%, more preferably 0.5% to 25% e.g. 1% to 20%, especially 2% to 15% e.g. 3% to 10%.

In particular two different specific systems which have been found effective have been a continuously dosed inhibitory system and a shock dosed remedial system. The former may typically contain from 1 to 50 ppm of THP, especially 2 to 100 ppm more especially 3 to 50 ppm, preferably 4 to 20 ppm, e.g. 5 to 10 ppm, while the latter usually contain from 0.1 to 50%, preferably 1 to 30% e.g. 5 to 20% by weight THP.

Formulations supplied to the user for dosing will usually be aqueous solutions containing at least 5% by weight e.g. from 10% to saturation more usually 15 to 55% by weight.

It is also possible to use solid mixtures of, e.g. amino phosphonates, THP and carboxylic acid. Especially preferred for some applications are mixtures, preferably with buffer, absorbed in or mixed with an inert solid substrate or diluent such as silica, talc, zeolite, bentonite, sodium sulphate, a solid carboxylic acid such as adipic acid or porous ceramic beads.

Formulations for use according to our invention may contain other water treatment products such as surfactants.

Surfactants for use in our invention typically contain hydrophobic groups such as alkenyl, cycloalkenyl, alkyl, cycloalkyl, aryl, alkyl/aryl or more complex aryl (as in petroleum sulphonates) moieties having from 8 to 22, preferably 10 to 20, typically 12 to 18 carbon atoms and a hydrophilic moiety. Other hydrophobic groups included in the invention are polysiloxane groups and polyoxypropylene groups.

The surfactant may for example consist substantially of an at least sparingly water-soluble salt of sulphonic or mono esterified sulphuric acids, e.g. an alkylbenzene sulphonate, alkyl sulphate, alkyl ether sulphate, olefin sulphonate, alkane sulphonate, alkylphenol sulphate, alkylphenol ether sulphate, alkylethanolamide sulphate, alkylethanolamideether sulphate, or alpha sulpho fatty acid or its ester each having at least one alkyl or alkenyl group with from 8 to 22, more usually 10 to 20, aliphatic carbons atoms.

The expression "ether" hereinbefore refers to compounds containing one or more glyceryl groups and/or an oxyalkylene or polyoxyalkylene group especially a group containing from 1 to 20 oxyethylene and/or oxypropylene groups. One or more oxybutylene groups may additionally or alternatively be present. For example, the sulphonated or sulphated surfactant may be sodium dodecyl benzene sulphonate, potassium hexadecyl benzene sulphonate, sodium dodecyl dimethyl benzene sulphonate, sodium lauryl sulphate, sodium tallow sulphate, potassium oleyl sulphate, ammonium lauryl sulphate, sodium tallow sulphate, potassium oleyl sulphate, ammonium lauryl monoethoxy sulphate, or monethanolamine cetyl 10 mole ethoxylate sulphate.

Other anionic surfactants useful according to the present invention include alkyl sulphosuccinates, such as sodium di-2-ethylhexylsulphosuccinate and sodium dihexylsulphosuccinate, alkyl ether sulphosuccinates, alkyl sulphosuccinamates, alkyl ether sulphosuccinamates, acyl sarcosinates, acyl taurides, isethionates, soaps such as stearates, palmitates, resinates, oleates, linoleates and alkyl ether carboxylates.

Anionic phosphate esters and alkyl phosphonates, alkyl amino and imino methylene phosphonates may be used. In each case the anionic surfactant typically contains at least one aliphatic hydrocarbon chain having from 8 to 22, preferably 10 to 20 carbon atoms, and, in the case of ethers, one or more glyceryl and/or from 1 to 20 oxyethylene and/or oxypropylene and/or oxybutylene groups.

Preferred anionic surfactants are sodium salts. Other salts of commercial interest include those of potassium, lithium, calcium, magnesium, ammonium, monoethanolamine, diethanolamine, triethanolamine, alkyl amines containing up to seven aliphatic carbon atoms, and alkyl and/or hydroxyalkyl phosphonium.

The surfactant may optionally contain or consist of non-ionic surfactants. The non-ionic surfactant may be e.g. $C_{10-22}$ alkanolamides of a mono or di-lower alkanolamine, such a coconut monethanolamide. Other non-ionic surfactants which may optionally be present, include tertiary acetylenic glycols, polyethoxylated alcohols, polyethoxylated mercaptans, polyethoxylated carboxylic acids, polyethoxylated amnes, polyethoxylated alkylolamides, polyethoxylated alkylphenols, polyethoxylated glyceryl esters, polyethoxylated sorbitan esters, polyethoxylated phosphate esters, and the propoxylate or ethoxylated and propoxylated analogues of all the aforesaid ethoxylated non-ionics, all having a $C_{8-22}$ alkyl or alkeny group and up to 20 ethyleneoxy and/or propyleneoxy groups. Also included are polyoxypropylene/polyethylene oxide block copolymers, polyoxybutylene/polyoxyethylene copolymers and polyoxybuylene/polyoxypropylene copolymers. The polyethoxy, polyoxypropylene and polyoxybutylene compounds may be end capped with, e.g. benzyl groups to reduce the foaming tendency.

Compositions of our invention may contain an amphoteric surfactant.

The amphoteric surfactant may for example be a betaine, e.g. a betaine of the formula $R_3N^+CH_2COO^-$, wherein each R is an alkyl, cycloalkyl, alkenyl or alkaryl group and preferably at least one, and more preferably not more than one R, has an average of from 8 to 20, e.g. 10 to 18 aliphatic carbons atoms and each other R has an average of from 1 to 4 carbon atoms. Particularly preferred are the quaternary imidazoline betaines often ascribed the formula:

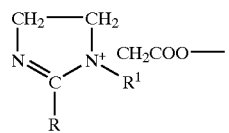

where R and R' are alkyl, alkenyl, cycloalkyl, alkaryl or alkanol groups having an average of from 1 to 20 aliphatic carbon atoms and R preferably has an average of from 8 to 20, e.g. 10 to 18 aliphatic carbon atoms and R' preferably has 1 to 4 carbon atoms. In practice it has been shown that these compounds exist predominantly in the equivalent open chain form. Other amphoteric surfactants for use according to our invention include alkyl amine ether sulphates, sulphobetaines and other quaternary amine or quaternised imidazoline sulphonic acids and their salts, and Zwitterionic surfactants, e.g. N-alkyl taurines, carboxylates amido amines such as $RCONH(CH_2)_2N^+(CH_2CH_2CH_3)_2CH_2CO^-_2$ and amido acids having, in each case, hydrocarbon groups capable of conferring surfactant properties (e.g. alkyl, cycloalkyl alkenyl or alkaryl groups having from 8 to 20 aliphatic carbon atoms). Typical examples include 2-tallow alkyl, 1-tallow amido alkyl, 1-carboxymethyl imidazoline and 2-coconut alkyl N-carboxymethyl 2 (hydroxyalkyl) imidazoline. Generally speaking any water soluble amphoteric or Zwitterionic surfactant compound which comprises a hydrophobic portion including $C_{8-20}$ alkyl or alkenyl group and a hydrophilic portion containing an amine or quaternary ammonium group and a carboxylate, sulphate or sulphonic acid group may be used in our invention.

Compositions of our invention may also include cationic surfactants.

The cationic surfactant may for example be an alkylammonium salt having a total of at least 8, usually 10 to 30, e.g. 12 to 24 aliphatic carbon atoms, especially a tri or tetra-alkylammonium salt. Typically alkylammonium surfactants for use according to our invention have one or at most two relatively long aliphatic chains per molecule (e.g. chains having an average of 8 to 20 carbon atoms each, usually 12 to 18 carbon atoms) and two or three relatively short chain alkyl groups having 1 to 4 carbon atoms each, e.g. methyl or ethyl groups preferably methyl groups. Typical examples include dodecyl trimethyl ammonium salts. Benzalkonium salts having one 8 to 20 C alkyl group two 1 to 4 carbon alkyl groups and a benzyl group are also useful.

Another class of cationic surfactant useful according to our invention comprises N-alkyl pyridinium salts wherein the alkyl group has an average of from 8 to 22, preferably 10 to 20 carbon atoms. Other similarly alkylated hetercyclic salts, such as N-alkyl isoquinolinium salts, may also be used.

Alkaryl dialkylammonium salts, having an average of from 10 to 30 aliphatic carbon atoms are useful, e.g. those in which the alkylaryl group is an alkyl benzene group having an average of from 8 to 22, preferably 10 to 20 carbon atoms and the other two alkyl groups usually have from 1 to 4 carbon atoms, e.g. methyl groups.

Other classes of cationic surfactant which are of use in our invention include so called alkyl imidazoline or quaternised imidazoline salts having at least one alkyl group in the molecule with an average of from 8 to 22 preferably 10 to 20 carbon atoms. Typical examples include alkyl methyl hydroxyethyl imidazolinium salts, alkyl benzyl hydroxyethyl imidazolinium salts, and 2 alkyl-1-alkylamidoethyl imidazoline salts.

Another class of cationic surfactant for use according to our invention comprises the amido amines such as those formed by reacting a fatty acid having 2 to 22 carbon atoms or an ester, glyceride or similar amide forming derivative thereof, with a di or poly amine, such as, for example, ethylene diamine or diethylene triamine, in such a proportion as to leave at least one free amine group. Quaternised amido amines may similarly be employed.

Alkyl phosphonium and hydroxyalkyl phosphonium salts having one $C_{8-20}$ alkyl group and three $C_{1-4}$ alkyl or hydroxyalkyl groups may also be used as cationic surfactants in our invention.

Typically the cationic surfactant may be any water soluble compound having a positively ionised group, usually comprising a nitrogen atom, and either one or two alkyl groups each having an average of from 8 to 22 carbon atoms.

The anionic portion of the cationic surfactant may be any anion which confers water solubility, such as formate, acetate, lactate, tartrate, citrate, chloride, nitrate, sulphate or an alkylsulphate ion having up to 4 carbon atoms such as methosulphate. It is preferably not a surface active anion such as a higher alkyl sulphate or organic sulphonate.

Polyfluorinated anionic, nonionic or cationic surfactant may also be useful in the compositions of our invention. Examples of such surfactants are polyfluorinated alkyl sulphates and polyfluorinated quaternary ammonium compounds.

Compositions our invention may contain a semi-polar surfactant such as an amine oxide e.g. an amine oxide containing one or two (preferably one) $C_{8-22}$ alkyl group, the remaining substituent or substitents being preferably lower alkyl groups, e.g. $C_{1-4}$ alkyl groups or benzyl groups.

Particularly preferred for use according to our invention are surfactants which are effective as wetting agents, typically such surfactants are effective at lowering the surface tension between water and a hydrophobic solid surface. We prefer surfactants which do not stabilise foams to a substantial extent.

Mixtures of two or more of the foregoing surfactants may be used. In particular mixtures of non-ionic surfactants with cationic and/or amphoteric and/or semi polar surfactants or with anionic surfactants may be used. Typically we avoid mixtures of anionic and cationic surfactants, which are often less mutually compatible. The surfactants in the compositions of our invention may be used as a biopenetrant.

Preferably the THP and the surfactant are present in a relative weight concentration of from 1:1000 to 1000:1, more usually 1:50 to 200:1, typically 1:20 to 100:1, most preferably 1:10 to 50:1, e.g. 1:1 to 20:1 especially 2:1 to 15:1.

The composition may additionally contain biocides, for example, formaldehyde or glutaraldehyde, water dispersants, demulsifiers, antifoams, solvents, scale inhibitors, corrosion inhibitors, oxygen scavengers and/or flocculants.

Scale or corrosion inhibitors which may be added to the water to be treated in conjunction with the present invention include phosphonates, such as 1-hydroxyethane-1,1-diphosphonates, polymaleates, polyacrylates, polymethacrylates, polyphosphates, phosphate esters, soluble zinc salts, nitrates, sulphite, benzoate, tannin, ligninsulphonates, benzotriazoles and mercaptobenzothiazoles amines, imidazolines, quaternary ammonium compounds resins and phosphate esters all added in conventional amounts. The scale and/or corrosion inhibitors may be added to the water separately from or in association with the phosphonium compound and surfactant. There may be added to the water to be treated oxygen scavengers, flocculants such as polyacrylamide dispersants, antifoams such as acetylenic diols, silicones or polyethoxylated antifoams or other biocides such as tin compounds or isothiazolones.

Compositions of the invention may also comprise non-surfactant biopenetrants including any of those described in WO99/33345.

The non-surfactant biopenetrant may for example be a quaternary ammonium polymer or copolymer. The quaternary ammonium polymer may for example be any of those described in U.S. Pat. No. 4,778,813. Particularly preferred is poly [oxyethylene(dimethyliminio) ethylene (dimethyliminio)ethylene dichloride]. This is a copolymer of NNN1N1-tetramethyl-1,2-diamino ethane with bis (2-chloroethyl) ether, which is commonly referred to as "WSCP". The latter is the commercial name of a product which is sold by Buckman Laboratories. However any other water soluble polymer containing a plurality of quaternary ammonium groups may be used.

Such compounds typically comprise a polymeric cation of the formula:

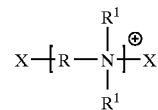

wherein: each R is a divalent organic group constituting with the ammonium group a monomeric residue or separately selected from two or more comonomeric residues; each $R^1$ is an alkyl or hydroxy alkyl group, typically having from 1 to 4 carbon atoms and preferably methyl or ethyl; X is hydrogen or a monovalent inorganic or organic end capping group; and n is from 2 to 3000, e.g. 5 to 2000, especially 8 to 1000, e.g. 10 to 500, most preferably 20 to 100. The counter ion may be any convenient THP-compatible anion e.g. chloride, sulphate, phosphate, bromide, fluoride, carbonate, formate, acetate, citrate, lactate, tartrate, methosulphate, borate or silicate.

R may for example be a $C_{1-6}$ alkylene, oxyalkylene, polyoxyalkylene, haloalkylene, halooxyalkylene, halopolyoxyakylene or

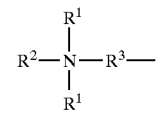

group wherein $R^2$ may be a $C_{1-6}$ alkylene, oxyalkylene polyoxyalkylene, haloalkylene, halooxyalkylene or halopolyoxyalkylene group and $R^3$ represents a covalent bond or an $R^2$ group ($R^1$ is as defined above). The polymer may for example be a methylated polyethylene polyamine of the formula

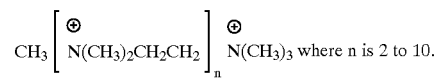

Some other typical examples include:
Poly [hydroxyethylene(dimethyliminio)ethylene (dimethyliminio)methylene dichloride]
Poly [hydroxyethylene(dimethyliminio)-2-hydroxypropylene (dimethyliminio) methylene dichloride]
N-[3-(dimethylammonio)propyl]-N[3-(ethyleneoxyethylenedimethylammonio) propyl]urea dichloride-4-[1-tris(2-hydroxyethyl)ammonium chloride-2-butenyl]poly[1-dimethyl ammonium chloride-2-butenyl]tris(2-hydroxyethyl)ammonium chloride The non-surfactant-biopenetrant may alternatively be a hydrotrope. Hydrotropes are sometimes confused with surfactants because they are also amphiphilic. However hydrotropes do not significantly affect surface tension at low concentrations. Hydrotropes act as solubilisers. When present in relatively high concentrations (e.g. greater than about 1%) they increase the water solubility of sparingly or moderately soluble solutes.

A preferred class of hydrotropes includes water soluble glycol ethers. The glycol ether is preferably a water soluble compound of the formula $HO[CR_2CR_2O]_nR'$ where each R is methyl, ethyl or preferably H, provided that the total number of carbon atoms per $[CR_2CR_2O]$ group does not exceed 4, more preferably is not more than 3 and most preferably is 2, R' is a lower hydrocarbon group such that the compound is water soluble, e.g. butyl, propyl, ethyl or preferably methyl and n is from 1 to 20, preferably 1 to 10, especially 1 to 5, typically 1 to 3, most preferably 2. Preferred examples include diethylene glycol monomethyl ether.

An important class of hydrotropes for use according to our invention comprises the lower alkyl aryl sulphonates. Water soluble salts, e.g. sodium, potassium, ammonium or salts of benzene sulphonic, toluene sulphonic, xylene sulphonic, ethyl benzene sulphonic or cumene sulphonic acids are very effective. Generally, alkylbenzene sulphonic acids having up to four or even five aliphatic carbon atoms show hydrotropicity but not significant surfactancy. Above six aliphatic carbons, e.g. sodium octyl benzene sulphonate, surfactancy predominates over hydrotropicity. Naphthalene sulphonates are also useful as non-surfactant biopenetrants, e.g. alkali metal $C_{1-4}$ alkyl naphthalene sulphonates. Urea is also an effective hydrotrope.

The biopenetrant synergist is not usually present in a greater weight concentration than the THP, although higher concentrations by weight based on THP e.g. up to 10:1 or even 100:1 are technically possible but commercially undesirable. The proportion is preferably less than 50% by weight based on the weight of THP, more usually less than 20%, typically less than 10%, especially less than 5%. Although very small amounts may be effective we prefer to use proportions of biopenetrant greater than 0.1% based on the weight of THP condensate, usually greater than 0.5%, especially greater than 1%.

When THP is added in the form of a THP$^+$ salt the latter may comprise any counterion which is compatible with the system. Preferred are sulphate, chloride and phosphate, but any other convenient anion which provides a water soluble salt may be used.

The invention will be illustrated by the following examples in which all proportions are by weight of active ingredient unless otherwise stated:

Iron sulphide (3 g accurately weighed) was stirred in a 100 g solution of 20% THPS and 6.6% sodium diethylene triamine pentakis (methylene phosphonate), sold commercially by Rhodia Consumer Specialties Limited under its Registered Trade Mark "BRIQUEST 543®", 60° C. for 24 hours. After this time the solution was filtered and the concentration of iron in the solution measured. The residual solid was dried and weighed to give the percentage weight loss.

Field scales used in these experiments are from actual oil fields and are of mixed iron sulphide composition.

| Example | Sulphide | Treatment | Wt Loss (%) | Iron Concentration in Solution (ppm) |
|---|---|---|---|---|
| 1 | Iron sulphide (commercial) | THPS alone | — | 6550 |
|   |   | THPS/Phosphonate | — | 26750 |
|   |   | Water | — | 382 |
|   |   | Phosphonate | — | 400 |
| 2 | Field scale 1 | THPS alone | 57 | 7400 |
|   |   | THPS/Phosphonate | 69 | 9100 |
| 3 | Field scale 2 | THPS alone | 39 | 1320 |
|   |   | THPS/Phosphonate | 63 | 2700 |
| 4 | Field scale 3 | THPS alone | 64 | 3900 |
|   |   | THPS/Phosphonate | 75 | 4200 |
| 5 | Field scale 4 | THPS alone | 62 | 4430 |
|   |   | THPS/Phosphonate | 86 | 5750 |
| 6 | Iron disulphide (commercial) | THPS alone | — | 10350 |
|   |   | THPS/Phosphonate | — | 13000 |
| 7 | Zinc sulphide (field) | THPS/Phosphonate | 23 | — |

We claim:

1. A method of treating a water system containing or in contact with a metal sulphide scale selected from the group consisting of iron sulphide, lead sulphide, zinc sulphide and combinations of any two or more or said sulphides, said method comprising the following steps:
    (a) adding to said water system, separately or together:
        (i) sufficient of a phosphorus compound selected from the group consisting of tris(hydroxyorgano) phosphines (THP) and tetrakis (hydroxyorgano) phosphonium salts (THP+ salts) and
        (ii) sufficient of an amino-phosphonate chelant of the formula $R^1R^2NCH_2PO_3X_2$, wherein
    at least one of said $R^1$ and $R^2$ is a —$CH_2PO_3X_2$ group and the other is selected from the group consisting of $CH_2PO_3X_2$, $(CH_2)_nOH$ and $[(CH_2)_nNCH_2PO_3X_2]_mCH_2PO_3X_2$, where each n is independently 2 or 3 and m is from 1 to 5, and
    X is hydrogen or a cation such that said amino-phosphonate is water soluble;
    to provide a solution containing from 0.1 to 50% by weight of said THP or said THP+ salt and from 0.1 to 50% by weight of said chelant;
    (b) contacting said metal sulphide scale with said solution (a), thereby dissolving at least part of said scale in said solution; and
    (c) withdrawing from said water system said solution containing said at least part of said scale.

2. The method of claim 1, wherein X is an alkali metal selected from the group consisting of sodium, potassium, rubidium and caesium.

3. The method of claim 1, wherein X is an organic base selected from alkylamines and alkanol amine having up to 6 carbon atoms.

4. The method of claim 1, wherein said THP or THP$^+$ salt and said chelant are present in said solution (a) in a proportion of from 1:40 to 40:1 by weight.

5. The method of claim 4, wherein said proportion is about 1:1 by weight.

6. The method of claim 1, wherein said THP or THP+ salt and said chelant are present in said solution together with a buffer, said buffer comprising a water soluble carboxylate salt of a strong base.

7. The method of claim 6, wherein said water soluble carboxylate salt is selected from the group consisting of formates, acetates, propionates, lactates, tartrates, maleates, fumarates, acrylates, citrates, oxalates, malates, succinates, adipates, malonates, caprates, suberates, azelaates, pimelates, aconitates, citraconates, itaconates, angelates, tiglates, crotonates, isocrotonates, salicylates, phthalates, phenylacetates and benzoates.

8. The method of claim 6, wherein said strong base is selected from the group consisting of ammonium ions and alkali metal ions.

9. The method of claim 8, wherein said strong base is said alkali metal ions which are selected from the group consisting of sodium, potassium, rubidium and caesium ions.

10. The method of claim 6, wherein the ratio of said carboxylate salt to said THP or THP$^+$ salt is from 1:30 to 1:1 by weight.

11. The method of claim 10, wherein said ratio is from 1:7 to 1:5 by weight.

12. The method of claim 1, wherein said THP or THP$^+$ salt and said chelant are added to said water system at a temperature above 40° C.

13. The method of claim 12, wherein said temperature is between 60 to 150° C.

14. The method of claim 1, wherein the concentration of each of said THP or THP$^+$ salt and said chelant in said system is from 3% to 10% by weight.

15. The method of claim 1, wherein said THP or THP$^+$ salt and said chelant, are added to said system as a solid mixture.

16. The method of claim 15, wherein said solid mixture is absorbed in or mixed with an inert solid substrate or diluent selected from the group consisting of silica, talc, zeolite, bentonite, sodium sulphate, solid carboxylic acids and porous ceramic beads.

17. The method of claim 16, wherein said solid carboxylic acid is adipic acid.

18. The method of claim 1, wherein said solution further contains a surfactant.

19. The method of claim 18, wherein said surfactant is selected from the group consisting of anionic surfactants, nonionic surfactants, amphoteric surfactants, cationic surfactants and mixtures of any two or more of said anionic, nonionic, cationic and amphoteric surfactants.

20. The method of claims 18, wherein said THP or THP$^+$ salt and said surfactant are present in said system in a relative weight ratio of from 1:1000 to 1000:1.

21. The method of claim 20, wherein said ratio is from 2:1 to 15:1.

22. The method of claim 1, wherein said system further contains at least one additive selected from the group consisting of biocides, water dispersants, demulsifiers, antifoams, solvents, scale inhibitors, corrosion inhibitors, oxygen scavengers, flocculants and non-surfactant biopenetrants.

23. The method of claim 22, wherein said non-surfactant biopenetrant is a quaternary ammonium polymer or copolymer.

24. The method of claim 22, wherein said non-surfactant biopenetrant is a hydrotope.

25. The method of claim 22, wherein said corrosion inhibitor is 1-hydroxyethane-1,1-diphosphonic acid.

26. The method of claim 22, wherein said non-surfactant biopenetrant is present in said system in an amount of less than 50% by weight, based on the weight of said THP or THP$^+$ salt.

27. The method of claim 26, wherein said amount is less than 5% by weight, based on the weight of said THP or THP$^+$ salt.

28. The method of claim 1, wherein said phosphorus compound is a THP$^+$ salt selected from the group consisting of THP chloride, THP phosphate and THP sulphate.

29. A method of treating a water system containing or in contact with a metal sulphide scale, said method comprising the following steps:
(a) adding to said water system, separately or together:
  (i) sufficient of a phosphorus compound selected from the group consisting of tris(hydroxyorgano) phosphines (THP) and tetrakis(hydroxyorgano) phosphonium salts THP+ salts) and
  (ii) sufficient of an amino-phosphonate chelant
  to provide a solution containing from 0.1 to 50% by weight of said THP or said THP+ salt and from 0.1 to 50% by weight of said chelant;
(b) contacting said metal sulphide scale with said solution (a), thereby dissolving at least part of said scale in said solution; and
(c) withdrawing from said water system said solution containing said at least part of said scale, wherein said chelant consists essentially of diethylenetriaminepentakis (methylene-phosphonic acid).

* * * * *